United States Patent
Kohli et al.

(10) Patent No.: US 6,754,344 B2
(45) Date of Patent: Jun. 22, 2004

(54) CASE FOR A FOLDING-TYPE MOBILE PHONE

(76) Inventors: Paramjit Kohli, 15 Grace Street, P.O. Box 270, Cranbourne, Victoria (AU), 3977; Jung-Ki Kim, 530-2 Yong Hyunn Dong, Ui Jung Bu City (KR), Kyoung Ki 480-050

( * ) Notice: Subject to any disclaimer, the term of this patent is extended or adjusted under 35 U.S.C. 154(b) by 0 days.

(21) Appl. No.: 10/064,599

(22) Filed: Jul. 30, 2002

(65) Prior Publication Data

US 2003/0219115 A1 Nov. 27, 2003

(30) Foreign Application Priority Data

May 24, 2002 (KR) ......................................... 2002-15846

(51) Int. Cl.⁷ ................................................ H04M 1/00
(52) U.S. Cl. ...................................... 379/446; 379/455
(58) Field of Search ................................ 379/446, 455, 379/454; 224/544, 539; 455/90.3

(56) References Cited

U.S. PATENT DOCUMENTS

| | | | |
|---|---|---|---|
| D382,996 S | 9/1997 | Kopel | D3/218 |
| D395,749 S | 7/1998 | Jayez | D3/218 |
| D401,055 S | 11/1998 | Jayez | D3/218 |
| 5,971,242 A | * 10/1999 | Schuerman | 224/544 |
| D416,132 S | 11/1999 | Tan | D3/218 |
| D419,290 S | 1/2000 | Treyer et al. | D3/218 |
| D419,760 S | 2/2000 | Goodman | D3/218 |
| D420,218 S | 2/2000 | Chen | D3/218 |
| D435,722 S | 1/2001 | Pepping | D3/218 |
| D453,417 S | 2/2002 | Badillo et al. | D3/218 |
| 6,367,672 B1 | 4/2002 | Lind | 224/245 |
| D459,874 S | 7/2002 | Gur et al. | D3/218 |
| D461,306 S | 8/2002 | Johnson | D3/218 |
| 6,454,146 B2 | 9/2002 | Alis | 224/250 |

* cited by examiner

Primary Examiner—Jack Chiang
(74) Attorney, Agent, or Firm—Blumenfeld, Kaplan & Sandweiss, P.C.

(57) ABSTRACT

A case for a folding-type mobile telephone is shown which is divisible into two sections, each section having a room. The room of one section is for the body of the phone and the room of the other section is for cover. Each section has elastic portions and the sections snap together so that the case can fit a wide variety of phone models, regardless of size. An antenna fixing strap is also provided so that the phone will not easily fall out of the case.

5 Claims, 2 Drawing Sheets

CASE FOR A FOLDING-TYPE MOBILE PHONE

BACKGROUND OF INVENTION

1. Field of the Invention

The invention relates to cases for mobile phones, and more specifically to a molded leather case for folding-type mobile phones.

2. Description of the Prior Art

Each manufacturer of mobile phones typically provides a variety of models of phones. Many of the phones are of the folding variety, having a clamshell body. It would be ideal if each manufacturer provided a case suitable for each model of mobile phone on an individual model basis, but conventionally, distributors do not carry cases for the folding-type mobile phones on a model-by-model basis. Instead, they provide consumers with mobile phone cases, the size of which is approximate so that it is suitable for a wide variety of models.

Furthermore, even when a case is sized to match a particular mobile phone model, the case often has a problem in that the phone is prone to fall out if the user is careless. This is because the case is a simple insertion type case, lacking any sort of fastening means in the case.

Thus, it is an object of the present invention to overcome these limitations of prior art mobile phone cases for folding-type phones, by providing a case for a mobile phone that fixes the phone in the case and simultaneously provides separate, detachable rooms for the body and cover of a mobile phone.

SUMMARY OF INVENTION

With the above objects in mind, the present invention, fastens the mobile phone to the by providing a case construction that fixes the mobile phone antenna under an elastic band (4), which is respectively sewn on both sides (10) of the body of a mobile phone case (2) so that such both sides (10) may be elastic. One end of an antenna fixing strap (6) is fixed to the rear upper end of the case (2) with a male snap (8), while a female snap (8a) is fixed to the other end thereof and said strap can form a ring through which the antenna is fixed by mating the female snap with the male snap provided in the case.

The case (2) has two rooms (20)(30) which are combined with snaps. First, this enables the case (2) to be used with a wide variety of mobile phone regardless of size, including folding-type phones. This also enables the case (2) to be used even with the room (30) for the cover being removed because of the antenna fixing strap (6), which holds the phone in place within the room (20) for the body of the phone.

BRIEF DESCRIPTION OF DRAWINGS

The advantages of this invention will be better understood by referring to the accompanying drawings, in which.

DETAILED DESCRIPTION

Figures 1, 2:
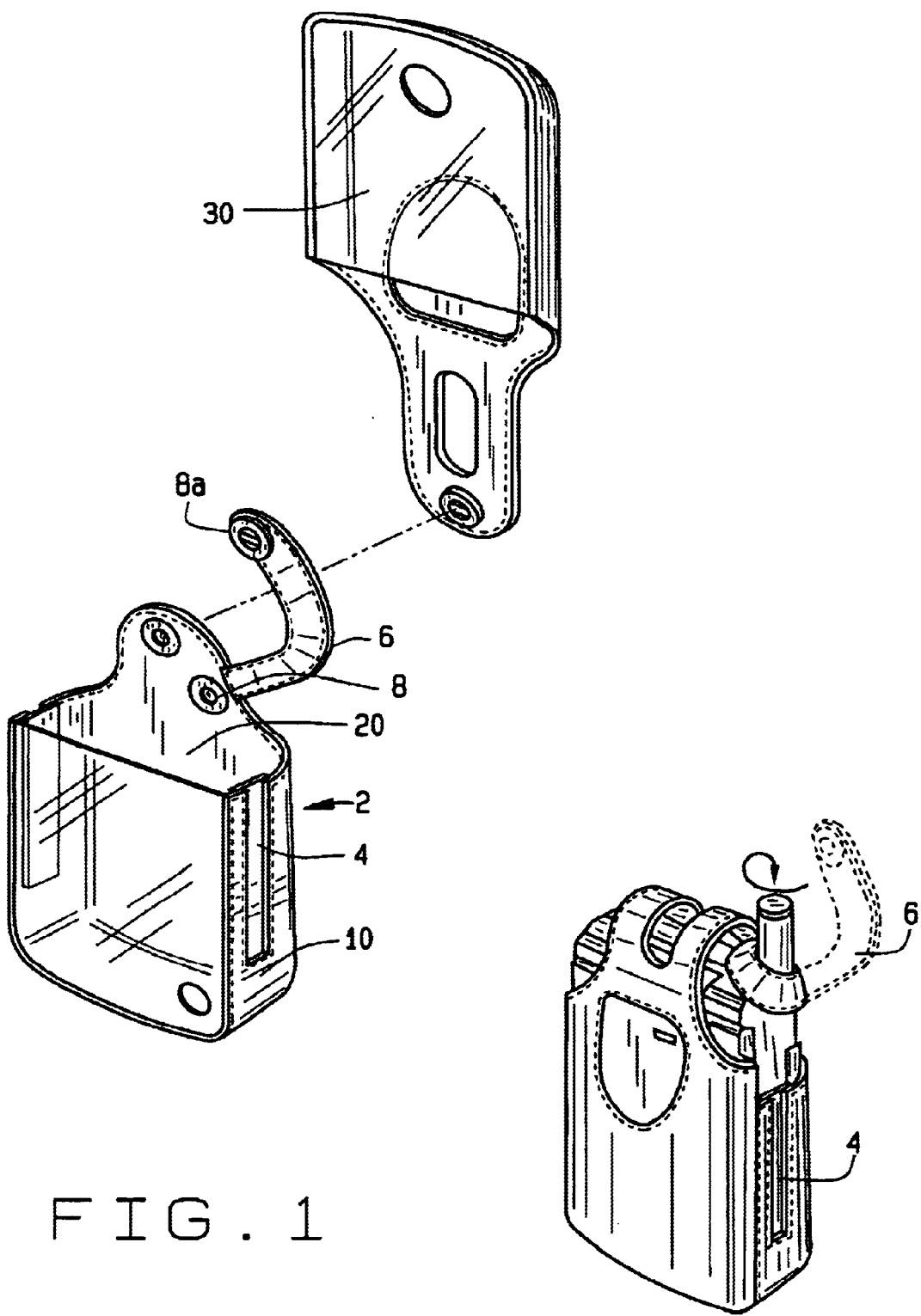
FIG. 1 is an exploded perspective view of a case for a folding-type mobile phone according to the present invention.
FIG. 2 is a perspective view of the mobile phone case of FIG. 1 in use.
Figure 3:
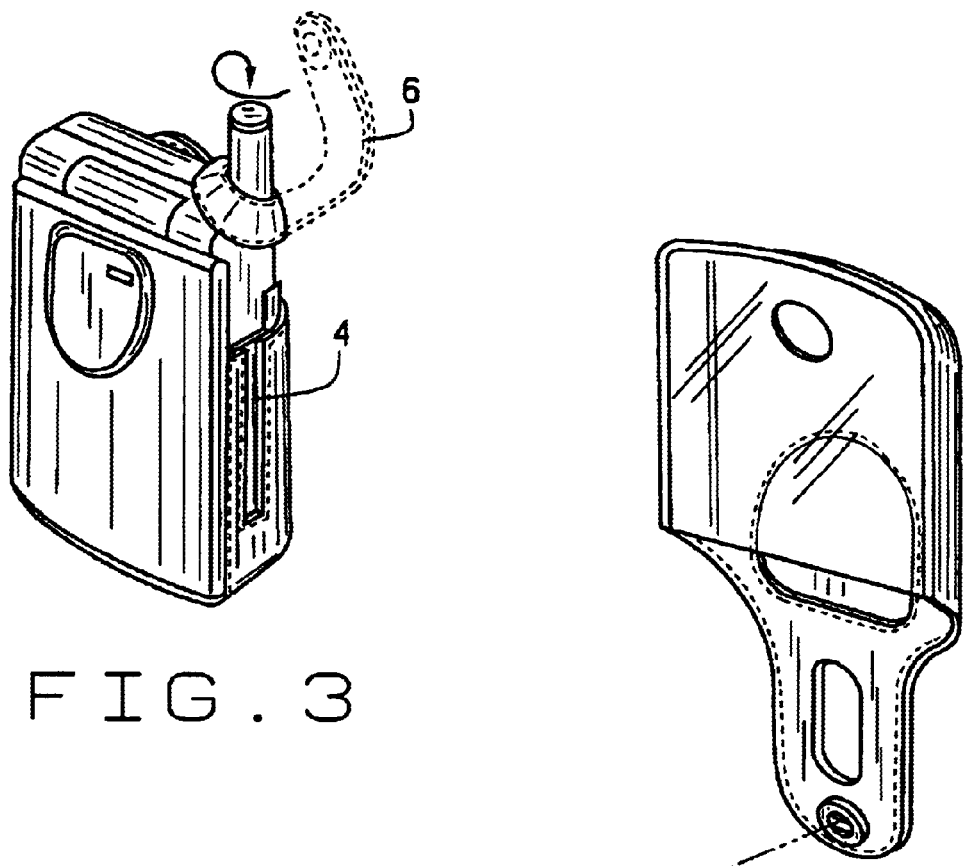
FIG. 3 is a perspective view of the mobile phone case of FIG. 1 in use, but with its cover being removed.

Referring now to FIGS. 1 to 3 a case (2) of the present invention is shown generally. The mobile phone case (2) forms two spaces (20)(30) so that the mobile phone body and the mobile phone cover may be respectively and separately inserted into it. This invention has a construction under which an elastic band (4) is respectively sewn on both sides (10) of the body of a mobile phone case (2) so that both sides (10) may be elastic. One end of an antenna fixing strap (6) is fixed to the rear upper end of the case (2) with a male snap (8), while a female snap (8a) is fixed to the other end thereof. Said strap can form a ring in the case by mating the female snap with the male snap, which is shown in FIGS. 2 and 3.

Figure 4:
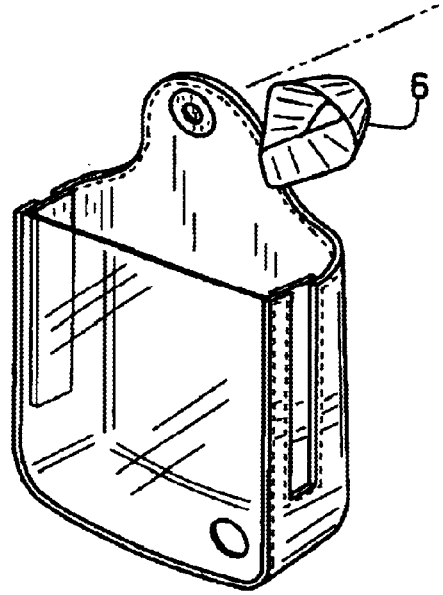
FIG. 4 is a perspective view of an alternate embodiment of the present invention.

FIG. 4 shows another embodiment according to this invention, providing an antenna fixing strap ring as formed by sewing both ends of an elastic band (12) on the upper end of the case.

The present invention can be used for any mobile phone, including any folding-type mobile phone, regardless of the size thereof. This is because the two sides of the case (2) are independent pieces, and thus extendable when the mobile phone is inserted into the case room (20).

When the mobile phone is inserted into the case room (20) and its antenna is fastened by the fixing strap (6) having its male snap (8) mated with its female snap (8a), the antenna firmly fixes the phone in the case (2). Accordingly, the mobile phone case of the present invention can be used with a wide variety of mobile phones, regardless of size.

Also, the mobile phone case according to this invention has an additional advantage that it can be used without the case room (30) for the cover, since the mobile phone is fixed to the case (2) by the antenna fixing strap (6), as shown in FIG. 3.

While the foregoing is directed to the preferred embodiments of the present invention, other and further embodiments of the invention may be devised without departing from the basic scope thereof, and the scope thereof is determined by the claims which follow.

What is claimed is:

1. A case for a folding-type mobile phone comprising:

a first section having a room for a base of a folding-type mobile phone;

a second section having a room for a cover of the mobile phone;

elastic portions integrated into two sides of each of said first and second sections;

an antenna fixing strap having a first end permanently fixed to an upper end of said first section, and a second end having a male snap fixed thereon;

a female snap fixed on the upper end of said first section and positioned so that the antenna fixing strap forms a loop when said second end of said strap is snapped to said first section; and correspondingly mating snaps on each of said first and second sections.

2. The case of claim 1, wherein said male snap and said female snap are reversed.

3. The case of claim 1, without said male snap and said female snap, but wherein said antenna fixing strap is elastic and both ends thereof are permanently fixed to the upper end of said first section.

4. A case for a folding-type mobile phone comprising:

a base section having a room for a base of a folding-type mobile phone;

an elastic portion integrated into two sides of said base section;

an antenna fixing strap having a first end permanently fixed to an upper end of said base section, and a second end having a male snap fixed thereon; and a female snap fixed on the upper end of said base section and positioned so that the antenna fixing strap forms a loop when said second end of said strap is snapped to said base section.

5. The case of claim 4, further comprising:

a cover section, said cover section having a room for a cover of the mobile phone; and correspondingly mating snaps on said base and said cover sections.

* * * * *